(12) United States Patent
Günther

(10) Patent No.: US 7,357,549 B2
(45) Date of Patent: Apr. 15, 2008

(54) VEHICLE LAMP

(75) Inventor: Thilo Günther, Wutha-Farnroda (DE)

(73) Assignee: FER Fahrzeugelektrik GmbH, Eisenach (DE)

(*) Notice: Subject to any disclaimer, the term of this patent is extended or adjusted under 35 U.S.C. 154(b) by 0 days.

(21) Appl. No.: 11/470,654

(22) Filed: Sep. 7, 2006

(65) Prior Publication Data
US 2007/0058383 A1    Mar. 15, 2007

(30) Foreign Application Priority Data
Sep. 9, 2005    (DE) .................. 20 2005 014 268 U

(51) Int. Cl.
*G02B 6/00* (2006.01)
*B60Q 1/26* (2006.01)
(52) U.S. Cl. ..................... 362/551; 362/494
(58) Field of Classification Search .................. 362/26, 362/375, 491, 494, 511, 540, 541, 542, 551, 362/555, 559
See application file for complete search history.

(56) References Cited

U.S. PATENT DOCUMENTS

| | | | | |
|---|---|---|---|---|
| 4,947,293 | A * | 8/1990 | Johnson et al. | 362/485 |
| 5,402,103 | A * | 3/1995 | Tashiro | 362/494 |
| 6,315,437 | B1 * | 11/2001 | Katz et al. | 362/555 |
| 6,637,917 | B2 * | 10/2003 | Schwanz et al. | 362/494 |
| 6,880,960 | B2 * | 4/2005 | Mishimagi | 362/511 |
| 2006/0152937 | A1 * | 7/2006 | Gandorfer | 362/491 |

* cited by examiner

Primary Examiner—Y. My Quach-Lee
(74) Attorney, Agent, or Firm—Sughrue Mion, PLLC

(57) ABSTRACT

A vehicle lamp, for example for installation in a cover cap of an external rear view mirror, includes an elongate light guide and a light source whose light is coupled into the light guide. The vehicle lamp has a light guide-cover plate unit which is formed in one piece and which includes the at least one light guide and at least one cover plate portion for concealing a part of the lamp interior.

13 Claims, 3 Drawing Sheets

VEHICLE LAMP

CROSS-REFERENCES TO RELATED APPLICATIONS

This application claims the priority of German Utility Model application Serial No. 20 2005 014 268.9 filed Sep. 9, 2005, the subject-matter of which is incorporated herein by reference.

FIELD OF THE INVENTION

The invention concerns vehicle lamps, more particularly but not exclusively side flashing lamps or side marking or riding lamps.

BACKGROUND OF THE INVENTION

Vehicle lamps such as for example side flashing lamps or side marking or riding lamps frequently use bar-shaped light guides into which the light of a light source such as in particular an LED, is coupled at the end. Light guides have in particular the advantage that a desired light distribution can be implemented using relatively simple means and very inexpensively.

Reference will be made at this juncture to describe the structure and function of a typical vehicle lamp with a bar-shaped light guide in greater detail. FIG. 1 shows a side flashing lamp 4 which is known from the state of the art and which is integrated in an external rear view mirror 1 of a motor vehicle. In the present example the side flashing lamp 4 includes two bar-shaped light guides 5, 5' which are arranged in mutually parallel superposed relationship and which extend substantially horizontally in the installed position on the vehicle. In operation light is coupled into the light guides 5, 5' at the vehicle side which is to the left in FIG. 1, and the light is propagated as far as the oppositely disposed ends and is coupled out there. A part of the light also passes to the exterior (forwardly in the direction of travel) through a light exit opening 3 in the cover cap 2.

FIG. 2 shows a view in section taken along line II-II in FIG. 1. As can be seen therefrom, arranged at the end 10 of the light guides 5, 5', which is the vehicle end, are light sources in the form of light emitting diodes 11 whose light is coupled into the light guides 5, 5' in a longitudinal direction L. The major part of the light is passed by total reflection at lateral interfaces to a coupling-out end 7. In that situation a part of the light is scattered or deflected and, as mentioned, passes to the exterior through the light exit opening 3. The coupling-out end 7 has a bevelled coupling-out surface 8 whose inclination is so selected that the light which issues is emitted into a solid angular region which is prescribed by regulation, that is to say substantially transversely with respect to the direction of travel and somewhat inclinedly rearwardly, as is indicated by arrows F. In that respect the light emission region is determined by the direction of the light guide at the coupling-out end 7 and the inclination of the bevelled surface 8.

The region in which the LED 11 is arranged is covered over by a cover plate 14. If in addition further parts in the interior of the lamp casing are to be covered over, further cover plates have to be provided. Each additional plate however signifies an additional component which has to be produced and fitted.

SUMMARY OF THE INVENTION

An object of the present invention is to provide a vehicle lamp such as a side flashing lamp having a light guide, which has fewer components and which is inexpensive to produce.

A further object of the invention is to provide a vehicle lamp which includes an internal structure for concealing at least part of the lamp interior which is not to be visible to the exterior, in an efficient manner involving a simple rational construction.

The foregoing and other objects are attained in accordance with the invention by a vehicle lamp, for example for installation in a cover cap of an external rear view mirror, comprising at least one elongate light guide and a light source whose light is coupled into the light guide in a longitudinal direction. The at least one light guide is part of a light guide-cover plate unit which is formed in one piece and which further includes at least one cover plate portion.

Further configurations of the invention are recited in appendant claims.

As will be seen in greater detail from the description hereinafter of a preferred embodiment the invention provides for producing a light guide-cover plate unit of a one-piece structure which includes the at least one light guide portion and at least one cover plate portion. That component thus combines the function of a light guide and the function of a cover plate, so additional cover plates are no longer required. That makes it possible to produce a vehicle lamp which is of a simple structure and inexpensive.

In accordance with a preferred embodiment of the invention the vehicle lamp includes a light guide-cover plate unit which has at least one elongate light guide and at least one region arranged laterally on the light guide, of a thinner cross-section. The side region or regions can be opaque entirely or at least at a predetermined portion thereof and thus serve as a cover plate.

The optically opaque property of the light guide-cover plate unit can be achieved for example by a suitable choice of material such as for example colored plastic material or by vapor deposition of an opaque material, for example Al, coating, by given structures in the material of the light guide unit, for example an erosion structure, by a two-component injection procedure or by optical devices in the light guide unit and so forth. Additional separate cover plates are not required by virtue thereof.

The light guide-cover plate unit is preferably an injection molded part. Such a member can be particularly easily and inexpensively produced. In accordance with a preferred embodiment the light guide-cover plate unit is produced using a two-component injection procedure, for example film backing injection, wherein the at least one light guide is made from light-conductive material and the laterally adjoining region which is at least partially of opaque material is applied thereto by injection.

A preferred embodiment of the light guide-cover plate unit includes at least two light guides which extend in substantially mutually parallel relationship and which extend in a longitudinal direction. In that arrangement the light guides are connected together by way of an intermediate region which may be opaque. Lateral wing regions are preferably arranged at the outer edges of the light guides.

The light guide-cover plate unit preferably extends over approximately the entire size of the light cover. It is preferably of a plate-shaped configuration and can be curved in at least one direction, for example about a vertical axis as viewed in the position of installation.

Preferably LEDs are used as the light sources.

A preferred embodiment of the light guide-cover plate unit includes at least one light guide which has a plurality of light guide portions arranged in adjoining relationship in the longitudinal direction and at least one light source, the light of which is coupled into the light guide portions at a central portion of the light guide in opposite directions. The region between two light guide portions at which the light source or sources is or are arranged can in that case be covered over by the light guide-cover plate unit itself. That has the advantage in particular that the fact that the light is coupled into the assembly centrally makes it possible to produce a vehicle lamp which is inexpensive and of a simple structure.

Preferably provided between two longitudinally adjacent light guide portions there is a holding means for a lamp means carrier, such as for example a circuit board. The holding means can for example be of such a configuration that the lamp means carrier is fitted into the holding means and is held in force-locking relationship therein. Optionally it would also be possible to provide a positively locking connection such as for example a latching connection. The vehicle lamp according to the invention can be particularly easily fitted with a circuit board by virtue of that arrangement.

The holding means is preferably formed in one piece with the light guide-cover plate unit. The light guide and the holding means can be produced for example in the form of a single injection molding.

Further objects, features and advantages of the invention will be apparent from the description hereinafter of a preferred embodiment.

DESCRIPTION OF THE PREFERRED EMBODIMENT

Figure 1:
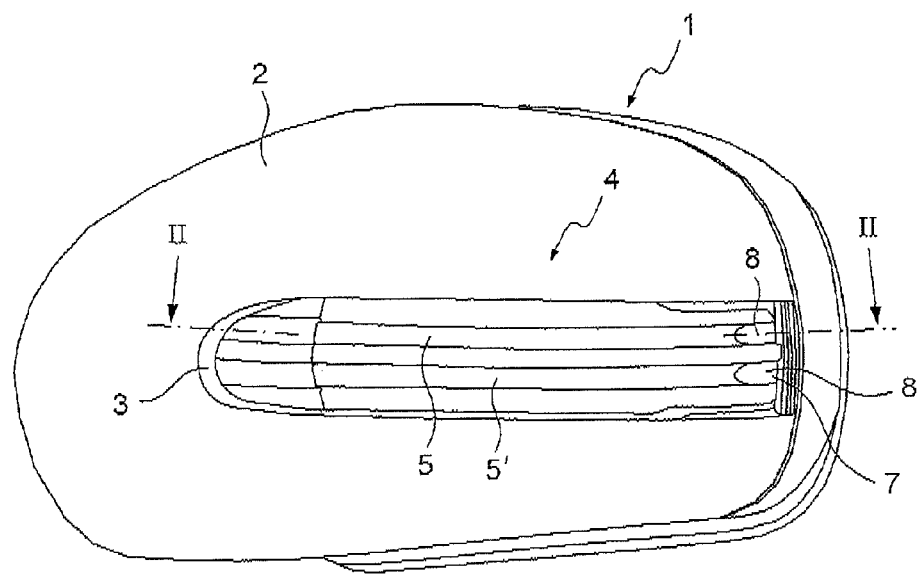
FIG. 1 shows a rear view of an external rear view mirror for motor vehicles with an integrated side flashing lamp.
Figure 2:
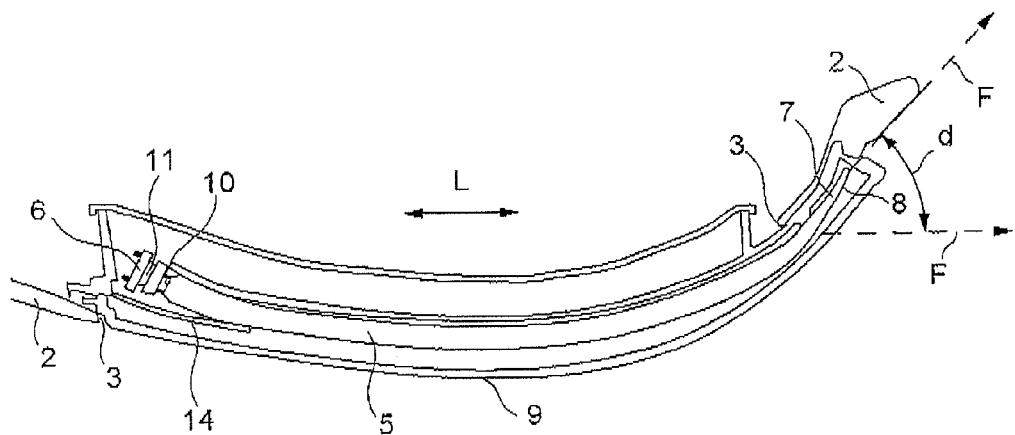
FIG. 2 shows a view in section taken along line II-II in FIG. 1.

With regard to the description of FIGS. 1 and 2 and for the avoidance of repetition here attention is directed to the introductory part of this description.

Figure 3:
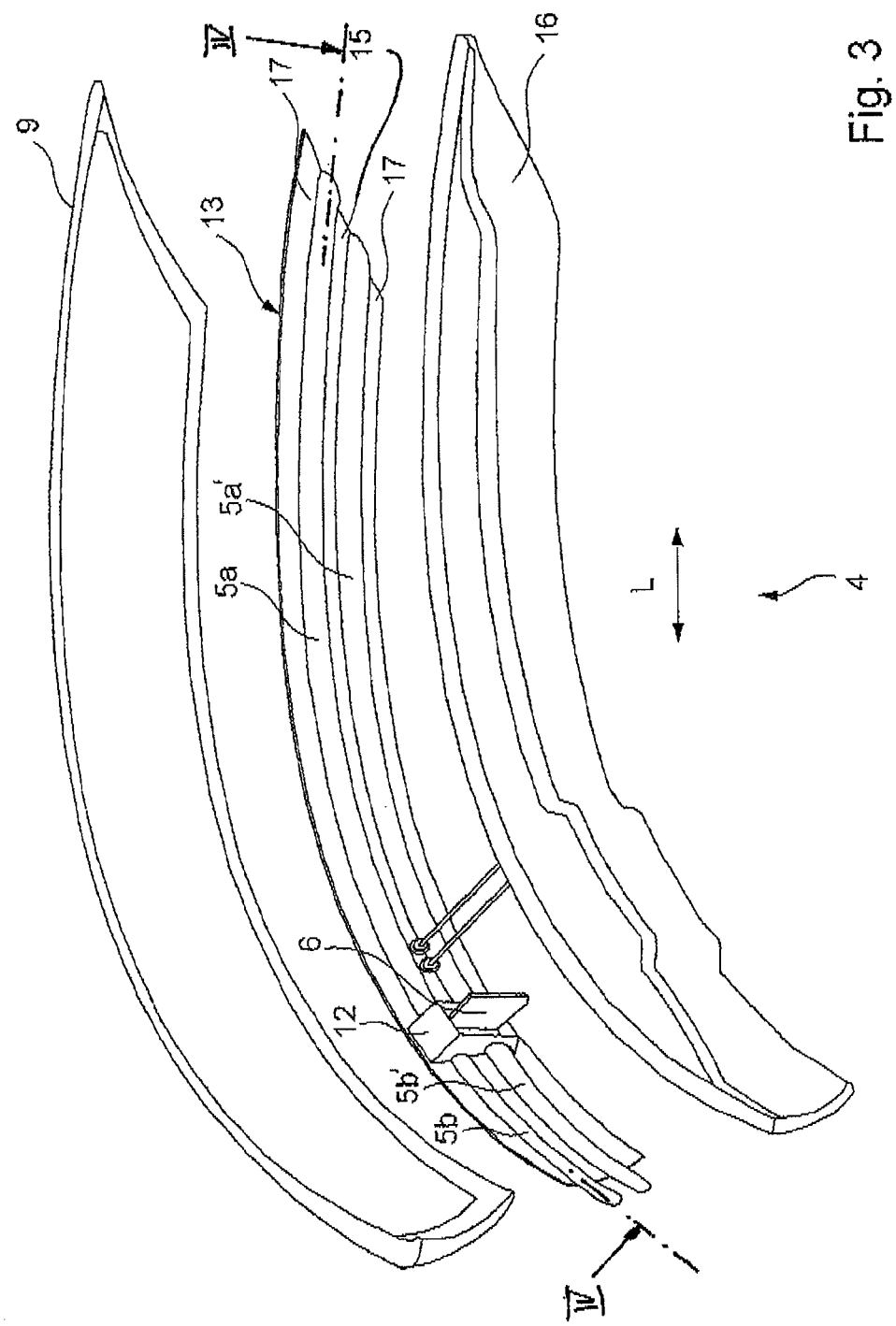
FIG. 3 shows a perspective view of a side flashing lamp with two bar-shaped light guides in accordance with an embodiment of the invention.
Figure 4:
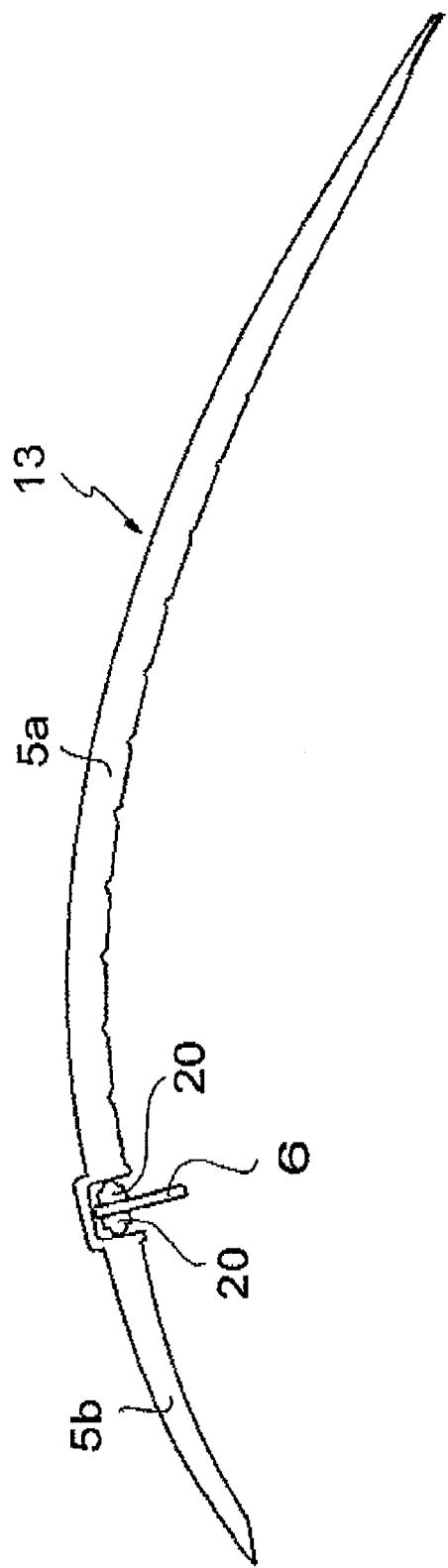
FIG. 4 shows a view in section taken along line IV-IV in FIG. 3.

Referring now to FIG. 3 shown therein is a perspective exploded view of a vehicle lamp in the form of a side flashing lamp 4, as can be installed for example in an external rear view mirror as shown in FIG. 1. The side flashing lamp 4 includes a casing 16, 9 in which a light guide-cover plate unit 13 is disposed. The casing includes a lower casing portion 16 and a light cover 9 through which the light can issue in the direction of travel or laterally. The light guide-cover plate unit 13 extends approximately over the entire length of the casing and here includes first and second bar-shaped light guides 5, 5' each of a multi-part structure. In other words, each of the light guides includes two light guide portions 5a, 5b and 5a', 5b' which are arranged in adjacent relationship in the longitudinal direction and which are disposed in mutual alignment.

Disposed in an intermediate space between two light guide portions 5a, 5b and 5a', 5b' respectively is a lamp means carrier, for example in the form of a circuit board 6, which is fitted with two respective LEDs (not shown) as light sources for each of the light guides 5, 5'. The light emitted by the LEDs 20, 20 is coupled into the light guide portions 5a, 5b and 5a', 5b' respectively in opposite directions.

In the embodiment illustrated here the bar-shaped light guides 5, 5' are a constituent part of a one-piece light guide-cover plate unit 13 which, besides the bar-shaped light guides 5, 5', includes an intermediate region 15 connecting the two light guides 5, 5' together, as well as outer (wing) regions 17. The intermediate region 15 and/or the lateral regions 17 can be made from the same material, in particular for example plastic material, as the light guides 5, 5'. The regions 15 and/or 17 are at least partially opaque in order to cover over parts in the interior of the casing 16.

The light guide-cover plate unit 13 is of such large dimensions that it covers substantially the surface of the light cover 9. The intermediate region 15 and the lateral regions 17 are of a thinner wall thickness than the bar-shaped light guides 5, 5'. The cross-section of the light guides 5, 5' is shown more particularly as being round but it can also be of another shape and can be for example rectangular or oval.

The light guide-cover plate unit 13 here performs two functions: on the one hand the light guides 5, 5' serve as lamp means, while on the other hand the regions 15 and/or 17 serve as a cover plate by means of which components disposed in the interior of the casing and which are intended not to be seen from outside can be concealed so that they are not visible from the exterior. Depending on the respective demands on the design of the flashing lamp 4, given portions of the light guide-cover plate unit 13 can be made entirely or partially opaque. The opaque regions can be produced for example by specific optical structures in the light guide unit 13, for example an erosion structure, by vapor deposition or application of an opaque layer or by a specific choice of an opaque material in that region.

The light guide-cover plate unit 13 can be produced for example in a two-component injection molding process in which the light guides 5, 5' are injected in a first material and the regions 15, 17 are applied thereto by injection and consist of a different second material, for example colored plastic material.

A circuit board holder 12 is provided in a region between two longitudinally adjacent light guide portions 5a, 5b and 5a', 5b' respectively. A circuit board 6 can be inserted into and/or latched in the holder 12. The circuit board holder 12 is here also a constituent part of the light guide-cover plate unit 13 and is formed in one piece therewith.

It will be appreciated that the invention has been described hereinbefore solely by way of example and illustration thereof and that various modifications and alterations may be made therein without thereby departing from the spirit and scope thereof.

What is claimed is:

1. A vehicle lamp comprising
at least one elongate light guide,
a light source positioned to couple its emitted light into the light guide in a longitudinal direction, and
a light guide-cover plate unit which is formed in one piece and which includes the at least one light guide and at least one cover plate portion,
wherein the light guide-cover plate unit includes a plurality of light guide portions arranged in adjacent relationship in the longitudinal direction, the arrangement being such that the light of at least one light source is coupled into the light guide portions between first and second longitudinally adjacent light guide portions in opposite directions.

2. A vehicle lamp as set forth in claim 1 wherein the light guide-cover plate unit is an injection molding.

3. A vehicle lamp as set forth in claim 1 wherein the light guide-cover plate unit is provided in a two-component injection molding process in which the at least one light guide is injected from a first material and the cover plate portion is injected from a second material.

4. A vehicle lamp as set forth in claim 1 wherein the light guide-cover plate portion includes an element which is opaque at least in a region of the light guide-cover plate unit.

5. A vehicle lamp as set forth in claim 1 wherein the cover plate portion is of a thinner cross-section than the light guide.

6. A vehicle lamp as set forth in claim 1 wherein the cover plate portion is made from a colored plastic material.

7. A vehicle lamp as set forth in claim 1 including a lamp means carrier between two longitudinally adjacent light guide portions.

8. A vehicle lamp as set forth in claim 7 wherein the lamp carrier means is a circuit board.

9. A vehicle lamp as set forth in claim 7 including a holding means for a lamp means carrier between first and second longitudinally adjacent light guide portions.

10. A vehicle lamp as set forth in claim 9 wherein the holding means is formed integrally with the light guide.

11. A vehicle lamp as set forth in claim 1 wherein the light guide-cover plate unit includes first and second light guides extending in substantially mutually parallel relationship.

12. A vehicle lamp as set forth in claim 1 which is devoid of any farther cover plate.

13. A vehicle lamp as set forth in claim 1 including means for installation thereof in a cover cap of an external rear view mirror of a vehicle.

* * * * *